United States Patent [19]

Uchiyama et al.

[11] Patent Number: 4,672,847
[45] Date of Patent: Jun. 16, 1987

[54] HOT-WIRE FLOW RATE MEASURING APPARATUS

[75] Inventors: Kaoru Uchiyama; Mitsukuni Tsutsui, both of Ibaraki, Japan

[73] Assignee: Hitachi, Ltd., Tokyo, Japan

[21] Appl. No.: 759,866

[22] Filed: Jul. 29, 1985

[30] Foreign Application Priority Data

Jul. 27, 1984 [JP] Japan ................................ 59-158259

[51] Int. Cl.$^4$ .............................................. G01F 1/68
[52] U.S. Cl. ...................................................... 73/204
[58] Field of Search ........................................... 73/204

[56] References Cited

U.S. PATENT DOCUMENTS

| 3,800,592 | 9/1974 | Jones, Jr. ................................ 73/204 |
| 4,297,881 | 11/1981 | Sasayama et al. ...................... 73/204 |
| 4,474,058 | 10/1984 | Drew et al. ............................ 73/204 |
| 4,562,731 | 1/1986 | Nishimura et al. .................... 73/204 |

*Primary Examiner*—Herbert Goldstein
*Attorney, Agent, or Firm*—Antonelli, Terry & Wands

[57] ABSTRACT

A hot-wire flow rate measuring apparatus includes a first thermo-sensitive resistive element disposed in the flow path of fluid under measurement, resistor unit connected in series to the first sensing element, a second thermo-sensitive resistive element for temperature compensation disposed in the flow path of the fluid, a control circuit adapted to supply a current to the serial connection of the first sensing element and the resistor unit in response to the difference between the voltage produced by the first sensing element and the voltage produced by the second sensing element, and an output circuit for producing a voltage representative of the fluid flow rate in response to the terminal voltage of the resistor. The apparatus is further provided with a current circuit which controls the ouptut characteristics of the output circuit by supplying a compensation current proportionate to the terminal voltage of the resistor to a portion of the serial connection.

16 Claims, 9 Drawing Figures

HOT-WIRE FLOW RATE MEASURING APPARATUS

BACKGROUND OF THE INVENTION

The present invention relates to a fluid flow rate measuring apparatus using a hot-wire of thermosensitive resistive material and, particularly, to a hot-wire flow rate measuring apparatus for measuring the flow rate of intake air in an automobile engine.

Automobile engines are required to control accurately the air-fuel ratio and ignition timing so as to maintain a lower toxicity of exhuast emission and fuel consumption rate, and for this purpose microcomputerized engine control systems have already been introduced. In such systems, the accuracy of measuring the intake air mass, i.e., intake air flow rate, determines the engine performance, and therefore the accurate flow rate measurement is particularly requested.

For measuring the fluid flow rate, there is known a hot-wire flow rate measuring technique applicable to the automobile engine air flow sensor, in which a heated thermo-sensitive resistive element is exposed to the fluid in its flow path and the flow rate is detected electrically based on the heat transfer characteristics pertaining to the fluid flow rate and the heating value of the resistive element, as disclosed for example in U.S. Pat. Nos. 3,747,577 and 4,297,881.

Figure 1:
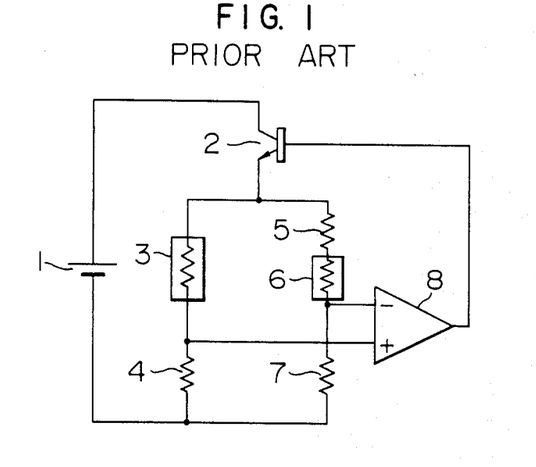
FIG. 1 is a schematic diagram showing the conventional flow rate measuring apparatus.

FIG. 1 shows the fundamental circuit arrangement of such a conventional flow rate measuring apparatus. A d.c. voltage source 1 supplies a current through the collector-emitter junction of a transistor 2 to a serial connection of a thermo-sensitive resistive element 3 and a resistor 4. Another serial connection of a resistor 5, a thermal compensation thermo-sensitive resistive element 6 and a resistor 7 is connected between the emitter of the transistor 2 and the negative terminal of the voltage source 1. The node of the sensing element 3 and resistor 4 and the node of the compensation sensing element 6 and resistor 7 provide a non-inverted input and inverted input for an amplifier 8, which has its output connected to the base of the transistor 2. The sensing element 3 is for the flow rate measurement and is disposed in the stream of fluid, while the sensing element 6 is placed in the flow path so as to detect the fluid temperature. The sensing element 3, resistors 4 and 5, compensation sensing element 6, and resistor 7 have respective resistances $R_3$, $R_4$, $R_5$, $R_6$, and $R_7$. Assuming the sensing elements 3 and 6 to have an equal temperature coefficient $\alpha$, their resistances are expressed as follows.

$$R_3 = R_{30}(1 + \alpha T_3) \tag{1}$$

$$R_6 = R_{60}(1 + \alpha T_6) \tag{2}$$

where $T_3$ and $T_6$ are temperatures of elements 3 and 6, $R_{30}$ and $R_{60}$ are resistances of elements 3 and 6 at the reference temperature.

The bridge circuit made up the components 3–7 has the equilibrium condition expressed as, $$R_7 \cdot R_3 = R_4 \cdot (R_5 + R_6) \tag{3}$$

The above equations (1), (2) and (3) are combined to give, $$\left(1 - \frac{R_4 R_{60}}{R_7 R_{30}}\right) T_6 + \Delta T = \frac{1}{\alpha} \left[\frac{R_4(R_5 + R_{60})}{R_7 R_{30}} - 1\right] \tag{4}$$

where $\Delta T = T_3 - T_6$

It is known that the heat produced by an electric current flowing in a heated body, i.e., the sensing element 3, placed in a flowing fluid is carried away by the fluid as expressed by the following equation.

$$Q = I^2 R_3 = (C_1 + C_2 \sqrt{U}) \Delta T \tag{5}$$

where $C_1$ and $C_2$ are constants, Q is heating value, I is current in resistive element 3, and U is the mass air flow rate per unit time.

Namely, when the differential temperature $\Delta T$ between the heating element and the fluid is constant, the heating value is proportional to the root of the air flow rate. By making the factor of $T_6$ equal to zero in equation (4) i.e., $R_4 \cdot R_{60}/R_7 \cdot R_{30} = 1$, the differential temperature $\Delta T$ becomes a constant determined from the circuit condition, and then it is possible to evaluate the flow rate by measuring the heating value Q. Thus, equation (4) is reduced to as follows.

$$\Delta T = \frac{R_5}{\alpha \cdot R_{60}} = \text{constant} \tag{6}$$

A problem of this method is that the temperature compensating thermo-sensitive resistive element 6 is heated by the current flowing in it, causing an error in the differential temperature $\Delta T$. The heating values produced by the resistors 3 and 6 are dependent on their terminal voltage. As can be seen from the circuit configuration of FIG. 1, the voltage applied across the sensing element 3 is substantially equal to the voltage applied across the serial connection of the resistor 5 and compensating element 6. In order to eliminate the effect of heating of the compensating element 6, it must have applied thereto a voltage creating a negligibly small amount of heat in it, while a voltage adequate to heat the sensing element 6 is applied to it. The ratio of resistances of the elements 5 and 6 is fixed by the equation (6), and therefore in order for the compensating element 6 to have a sufficiently small amount of heat generation, its resistance must be large enough as compared with the resistance of the sensing element 3. Manufacturing of thermo-sensitive resistive elements having greatly different resistances using the same material (e.g., platinum wire) is generally uneconomical and also likely to invite disparities of properties (e.g., temperature coefficient $\alpha$) during the manufacturing process.

On this account, hot-wire flow rate measurement is accompanied by many fluctuation factors of the heat transfer characteristics that relate the sensing element with the fluid. Accordingly, minimizing the disparity of the flow rate to output voltage characteristics among flow rate measuring devices is a technical theme in the mass production of automobile parts in the automotive industry.

SUMMARY OF THE INVENTION

An object of this invention is to provide a hot-wire flow rate measuring apparatus which is capable of accurate measurement by compensating disparities of the characteristics of thermo-sensitive resistive elements.

The above objective is achieved by the inventive circuit arrangement in which the flow rate output signal is fed back to the flow rate detector incorporating a thermo-sensitive resistive element so that disparities of the output characteristics of the apparatus caused by disparities of the characteristics of the sensing element is compensated.

DESCRIPTION OF THE PEFERRED EMBODIMENTS

This invention will now be described in detail with reference to the drawings. The general arrangement of the inventive flow rate measuring apparatus shown in FIG. 2 includes a thermo-sensitive resistive element 3 used to detect the flow of fluid, a current detector 12 for sensing the electric current flowing through the sensing element 3, an output circuit 14 for amplifying the output of the current detector 12 and producing an output voltage $V_0$ representative of the fluid flow rate, a driver 16 for activating the sensing element 3 in response to the outputs of a fluid temperature detector 18 and the current detector 12, and a current circuit 20 operating under control of the current detector 12.

Figure 3:
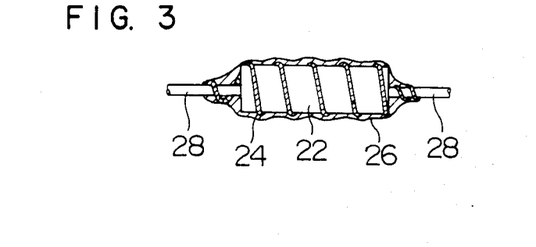
FIG. 3 is a partial cross-sectional view of the thermo-sensitivwe resistive element.

The thermo-sensitive resistive element has a structure as shown in FIG. 3, in which a thermosensitive resistor wire, e.g., platinum wire, 24 is wound around an insulator bobbin made of ceramic for example, with lead lines 28 being attached at respective ends of the wire, and the entire surface of the winding is coated with a protective material, e.g., glass, 26.

Figure 2:
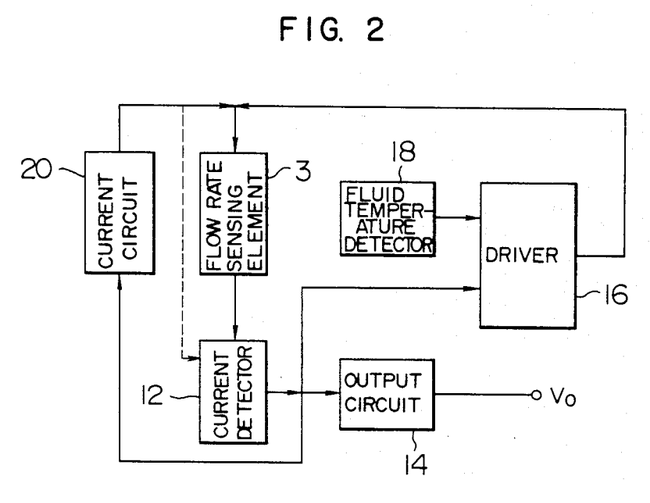
FIG. 2 is a block diagram showing the inventive flow rate measuring apparatus.
Figure 4:
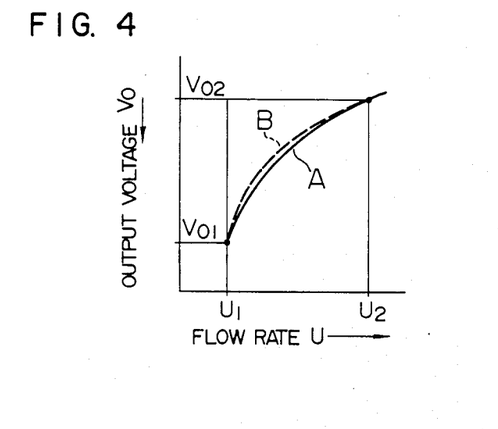
FIG. 4 is a graph showing the output characteristics of the apparatus shown in FIG. 2, but without connection of the current circuit.

The thermo-sensitive resistive element shown in FIG. 3, when employed in the flow rate measuring apparatus shown in FIG. 2 but without connection of the current circuit 20, provides the apparatus output characteristics as shown in FIG. 4. Disparities of the dimensions of the insulator bobbin 22 and lead lines 28, the thickness and density of the protective coat 26, and the length, diameter and specific resistance of the resistor wire 24 among products are all causes of disparities of the resistance of thermo-sensitive resistive elements. On this account, even though flow rate measuring apparatus are adjusted so as to provide consistent output voltages $V_{01}$ and $V_{02}$ against certain flow rates $U_1$ and $U_2$, the output characteristics in the flow rate range between $U_1$ and $U_2$ will fluctuate among each apparatus as shown by the solid line A and dashed line B in FIG. 4. The disparity of the output characteristics among apparatus is great in the lower flow rate range, and this inherent problem is especially troublesome when the apparatus is used for controlling an automobile engine.

The first embodiment of this invention based on the block diagram of FIG. 2 will be described with reference to FIGS. 5 and 6. In this embodiment, the current detector 12 is formed of a resistor 26, and the fluid temperature detector 18 is made up of a differential amplifier 28 and a serial connection of a resistor 30 and a thermo-sensitive resistive element 6 which is disposed in the fluid flow path for direct temperature sensing. The sensing element 6 is connected between the output and inverting input of the differential amplifier 28, which has its non-inverting input connected to the node of a thermo-sensitive resistive element 3 and the current sensing resistor 26.

The driver 16 is made up of a differential amplifier 32, a transistor (e.g., non type) 34 with its base connected to the output of the amplifier 32, and a serial connection of resistors 22 and 24 connected across the sensing element 3. The amplifier 32 has its non-inverting input connected to the output of the amplifier 28 and inverting input connected to the node of the resistors 22 and 24. The transistor 34 is supplied with a d.c. power voltage $V_B$ at the collector, and its emitter is connected to the sensing element 3.

The output stage 14 is made up of a differential amplifier 44 and resistors 46, 48, 50 and 52. The amplifier 44 has its non-inverting input supplied with the power voltage $V_B$ through a resistor 50 and also is grounded through a resistor 52, and its inverting input is connected to its output through a resistor 48 and also is connected through resistor 46 to the node 56 of the sensing element 3 and resistor 26.

The current circuit 20 is made up of a differential amplifier 42 and resistors 36, 37, 38 and 40. The amplifier 42 has its non-inverting input connected through the resistor 38 to the node 56 and also is grounded through the resistor 40, and its inverting input is connected through the resistor 37 to the node 56 and also is grounded through the resistor 36, while the output of the amplifier 42 is connected to the sensing element 3.

The output current $I_{20}$ of the current circuit 20 is expressed in terms of the voltage $V_2$ at the ungrounded end of the resistor 26 as follows.

$$I_{20} = \frac{V_2}{R_{36}} \times \frac{R_{40}}{R_{38} + R_{40}} \quad (7)$$

where $R_{36}$, $R_{38}$ and $R_{40}$ are resistances of resistors 36, 38 and 40, respectively.

Next, the operation of this embodiment will de described. The equilibrium condition of the circuit shown in FIG. 5 is given by the following expression.

$$R_3 = \frac{R_{22} + R_{24}}{R_{24}} \times \frac{R_{36}}{R_{30}} \times R_6 \quad (8)$$

where $R_3$, $R_{22}$, $R_{24}$, $R_{30}$ and $R_6$ are resistances of resistors 3, 22, 24, 30 and sensing element 6, respectively.

Figure 5:
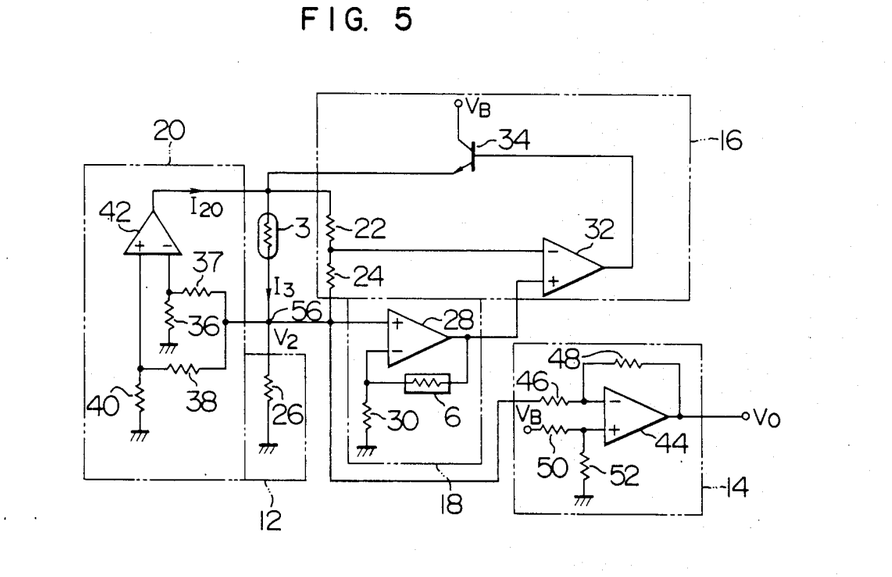
FIG. 5 is a schematic diagram showing the first embodiment of the inventive flow rate measuring apparatus.

In the arrangement of FIG. 5, the driver 16 controls the power supplied to the sensing element 3 in response to the resistance of the sensing element 6 so that the effect of the temperature variation of the fluid is compensated to meet the equation (8).

First, the circuit operation with the current circuit 20 being disconnected will be described. The power dissipation by the sensing element 3 and the fluid flow rate correlate with each other as expressed in the following equation.

$$I_3^2 \times R_3 = C_1 + C_2(PU)^n \qquad (9)$$

where $C_1$, $C_2$, and n are constants, $I_3$ is current in sensing element 3, P is density of fluid, and U is flow rate of fluid.

Equation (9) gives, $$I_3 = \left[ \frac{1}{R_3} \{C_1 + C_2(PU)^n\} \right]^{\frac{1}{2}} \qquad (10)$$

Since the current circuit 20 is not connected to the sensing element 3 and current detector 12, the whole current $I_3$ flows in the resistor 26. The voltage drop $V_2$ across the resistor 26 is given as, $$V_2 = I_3 \times R_{26} = R_{26} \left[ \frac{1}{R_3} \{C_1 + C_2(PU)^n\} \right]^{\frac{1}{2}}$$

where $R_{26}$ is the resistance of the resistor 26. The voltage $V_2$ is amplified by the output circuit 14, which produces the output voltage $V_0$ given by the following equation.

$$V_0 = \left( -\frac{R_{48}}{R_{46}} \right) R_{26} \left[ \frac{1}{R_3} \{C_1 + C_2(PU)^n\} \right]^{\frac{1}{2}} + \qquad (11)$$

$$\left( 1 + \frac{R_{48}}{R_{46}} \right) \cdot \frac{R_{52}}{R_{50} + R_{52}} \cdot V_B$$

where $R_{46}$, $R_{48}$, $R_{50}$ and $R_{52}$ are resistances of resistors 46, 48, 50 and 52, respectively.

Next, the operation of the circuit with the current circuit 20 connected to the sensing element 3 and current detector 12 will be described. The compensation current provided by the current circuit 20 is given by equation (7). The current $I_{20}$ flows through the sensing element 3 and returns to the current circuit 20 without branching to the resistor 26. Accordingly, the voltage $V_2$ at the terminal of the resistor 26 is expressed as, $V_2 = R_{26}(I_3 - I_{20})$. Substituting the equations (7) and (10) into the above equation gives, $$V_2 = R_{26} \left[ \frac{1}{R_3} \{C_1 + C_2(PU)^n\} \right]^{\frac{1}{2}} -$$

$$R_{26} \times \frac{V_2}{R_{36}} \times \frac{R_{40}}{R_{38} + R_{40}}$$

This equation is reformed as, $$V_2 = \frac{1}{1 + \frac{R_{26}}{R_{36}} \times \frac{R_{40}}{R_{38} + R_{40}}} \times R_{26} \times$$

$$\left[ \frac{1}{R_3} \{C_1 + C_2(PU)^n\} \right]^{\frac{1}{2}}$$

By receiving the voltage $V_2$, the output circuit 14 provides the output voltage which is expressed by the following equation.

$$V_0 = \left( -\frac{R_{48}}{R_{46}} \right) \left[ \frac{1}{1 + \frac{R_{26}}{R_{36}} \times \frac{R_{40}}{R_{38} + R_{40}}} \times \right. \qquad (12)$$

$$\left. R_{26} \left[ \frac{1}{R_3} \{C_1 + C_2(PU)^n\} \right]^{\frac{1}{2}} \right] +$$

$$\left( 1 + \frac{R_{48}}{R_{46}} \right) \frac{R_{52}}{R_{50} + R_{52}} \times V_B$$

Figure 6:
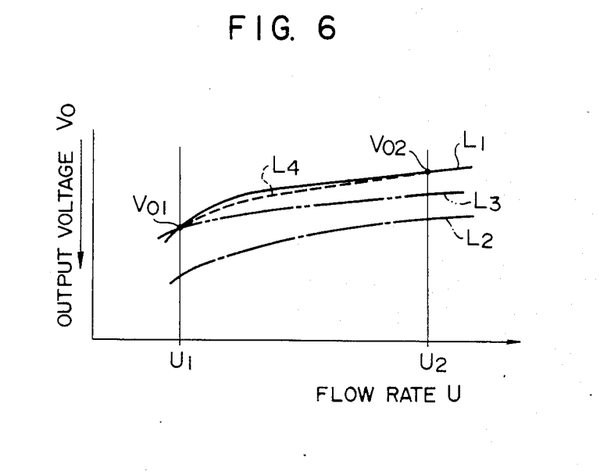
FIG. 6 is a graph showing the output characteristics of the arrangement shown in FIG. 5.

FIG. 6 shows in a graph the output voltage $V_0$ of the output circuit 14 plotted against the fluid flow rate. The curve $L_1$ represents the output characteristics in the absence of the current $I_{20}$ as expressed by equation (11), and the circuit provides output voltages $V_{01}$ and $V_{02}$ against flow rates $U_1$ and $U_2$, respectively.

With the current $I_{20}$ supplied from the current circuit 20 to the sensing element 3, the output voltage $V_0$, as expressed by equation (12), is represented by the curve $L_2$ which is increased by an amount proportional to the current $I_{20}$ relative to the curve $L_1$. By adjusting the value of resistor 50 or 52 in the output circuit 14 so that the output voltage $V_0$ at flow rate $U_1$ on curve $L_2$ coincides with the output voltage $V_{01}$ on curve $L_1$, the characteristic curve $L_2$ is converted to curve $L_3$. Furthermore, by adjusting the value of resistor 48 so that the output voltage $V_0$ at flow rate $U_2$ on curve $L_3$ coincides with $V_{02}$ on $L_1$, the characteristic curve $L_3$ is converted to $L_4$. The resultant characteristic curve $L_4$ is only slightly greater than the magnitude of output voltage $V_0$ in the flow rate range between $U_1$ and $U_2$ with respect to the characteristic curve $L_1$. Accordingly, uneven output characteristics of flow rate measuring apparatus caused by disparities of the characteristics of sensing elements 3 and 6 shown in FIG. 4 can be compensated by initially classifying disparities of the characteristics of thermo-sensitive resistive elements 3 and 6, setting the compensating current $I_{20}$ by adjusting the resistors 36, 38 and 40, and finally adjusting the output voltage characteristics by adjusting the resistors 48, 50 and 52.

By the circuit arrangement of this embodiment, in which the voltage produced by the sensing element 3 is compared with the voltage created by the temperature compensating element 6 and the differential voltage is fed back to the drive current of the element 3, the sensitivity of detecting the flow rate is high and the compensation against the variation in the fluid temperature is satisfactory.

Figure 7:
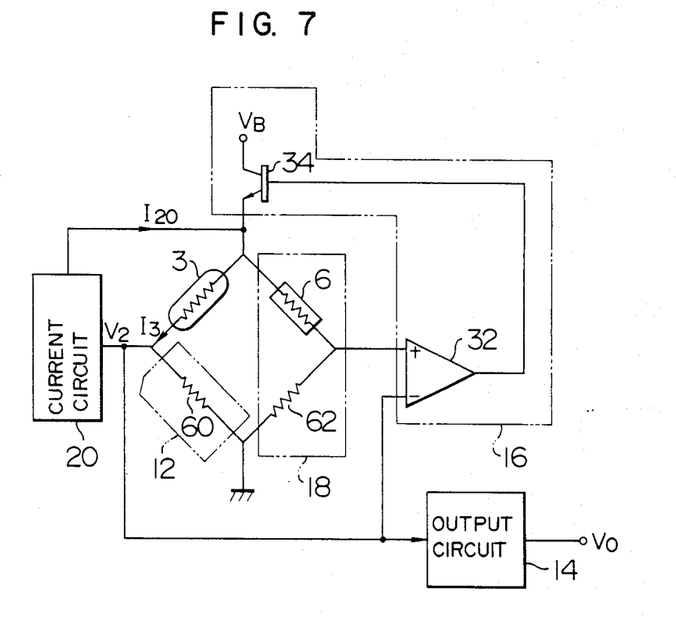
FIG. 7 is a schematic diagram showing the second embodiment of the inventive flow rate measuring apparatus.

FIG. 7 shows the second embodiment of this invention, in which circuit components and electrical value identical to those in FIG. 5 are referred to by common reference symbols. The arrangement of circuit blocks 14 and 20 are the same as shown in FIG. 5.

In this embodiment, a serial connection of a thermo-sensitive resistive element 3 and resistor 60 is connected in parallel with another serial connection of a thermo-sensitive resistive element 6 and resistor 62, with their common ends connected to the emitter of a transistor 34 and the ground. The node of the sensing element 3 and resistor 60 is connected to the inverting input of a differential amplifier 32 in the driver 16, while the node of the sensing element 6 and resistor 62 is connected to the non-inverting input of the amplifier 32, so that a bridge circuit is configured. The inverting input of the amplifier 32 is further connected to the inputs of the current circuit 20 and output circuit 14. In the driver 16, the output of the differential amplifier 32 is connected to the base of the transistor 34.

The equilibrium condition of the above circuit is given by the following equation.

$$R_3 = \frac{R_{60}}{R_{62}} \times R_6 \qquad (13)$$

where $R_{60}$ and $R_{62}$ are resistances of resistors 60 and 62, respectively.

With the current circuit 20 being disconnected, the output voltage $V_0$ is expressed as follows.

$$V_0 = \left(-\frac{R_{48}}{R_{46}}\right) R_{60} \left[\frac{1}{R_3}\{C_1 + C_2(PU)^n\}\right]^{\frac{1}{2}} + \qquad (14)$$

$$\left(1 + \frac{R_{48}}{R_{46}}\right) \cdot \frac{R_{52}}{R_{50} + R_{52}} \cdot V_B$$

When the current circuit 20 is connected, the output current $I_{20}$ flows through the sensing element 3 and returns to the circuit 20 without branching to the resistor 60. In this case, the output voltage $V_0$ is expressed as follows.

$$V_0 = \left(-\frac{R_{48}}{R_{46}}\right) \left[\frac{1}{1 + \frac{R_{26}}{R_{36}} \times \frac{R_{40}}{R_{38} + R_{40}}} \times \right. \qquad (15)$$

$$\left. R_{60}\left[\frac{1}{R_3}\{C_1 + C_2(PU)^n\}\right]^{\frac{1}{2}}\right] +$$

$$\left(1 + \frac{R_{48}}{R_{46}}\right) \cdot \frac{R_{52}}{R_{50} + R_{52}} \times V_B$$

Accordingly, also in this embodiment as in the previous embodiment, the output characteristics in the flow rate range between $U_1$ and $U_2$ can be adjusted to compensate the disparity of characteristics among sensing elements by raising the output voltage to offset the current $I_{20}$ through the adjustment of the resistors 36, 38 and 40 in the current circuit 20, and then adjusting the resistors 48, 50 and 52 in the output circuit 14.

Figure 8:
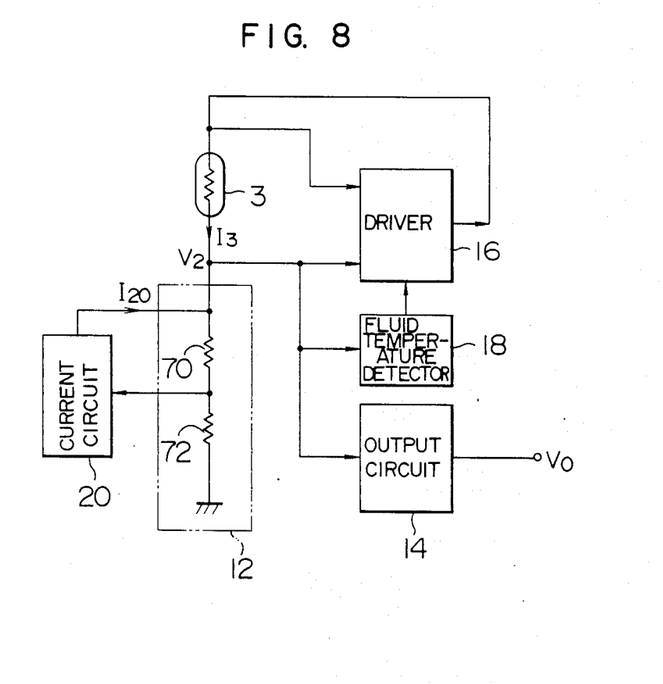
FIG. 8 is a schematic diagram showing the third embodiment of this invention.

FIG. 8 shows the third embodiment of this invention, in which the circuit blocks 14, 16, 18 and 20 are the same as described in the first embodiment. In the arrangement, a serial connection of resistors 70 and 72 constitutes a current detector 12, with its one end connected to the thermo-sensitive resistive element 3 and another end grounded. The node of the resistors 70 and 72 provides the input voltage to the current circuit 20, which supplies the output current $I_{20}$ not to the sensing element 3 in this embodiment, but to the node of the sensing element 3 and resistor 70 so that the current flows only through the resistor 70.

The equilibrium condition of this circuit is as follows.

$$R_3 = \frac{R_{22} + R_{24}}{R_{22}} \times \frac{R_{70} + R_{72}}{R_{30}} \times R_6 \qquad (16)$$

where $R_{70}$ and $R_{72}$ are resistances of resistors 70 and 72, respectively.

In case the current circuit 20 is disconnected, the voltage $V_2$ and the output voltage $V_0$ are given as follows.

$$V_2 = I_3 \times (R_{70} + R_{72}) \qquad (17)$$

$$= (R_{70} + R_{72})\left[\frac{1}{R_3}\{C_1 + C_2(PU)^n\}\right]^{\frac{1}{2}}$$

$$V_0 = \left(-\frac{R_{48}}{R_{46}}\right)(R_{70} + R_{72})\left[\frac{1}{R_3}\{C_1 + \qquad (18)\right.$$

$$\left. C_2(PU)^n\}\right]^{\frac{1}{2}} + \left(1 + \frac{R_{48}}{R_{46}}\right) \cdot \frac{R_{52}}{R_{50} + R_{52}} \cdot V_B$$

When the current circuit 20 is connected, the current $I_{20}$ flows only through the resistor 70 and returns to the circuit 20. Therefore, the voltage $V_2$ at the end of the current detector 12 is given as, $$V_2 = I_3(R_{70} + R_{72}) + I_{20} \cdot R_{70}$$

Substituting the equations (7) and (10) to the above equation gives, $$V_2 = (R_{70} + R_{72}) \times \left[\frac{1}{R_3}\{C_1 + C_2(PU)^n\}\right]^{\frac{1}{2}} +$$

$$R_{70} \cdot \frac{V_2}{R_{36}} \cdot \frac{R_{40}}{R_{38} + R_{40}}$$

This equation is reformed as, $$V_2 = \frac{1}{1 - \frac{R_{70} + R_{72}}{R_{36}} \cdot \frac{R_{40}}{R_{38} + R_{40}}} \times \qquad (19)$$

$$(R_{70} + R_{72}) \cdot \left[\frac{1}{R_3}\{C_1 + C_2(PU)^n\}\right]^{\frac{1}{2}}$$

Receiving the voltage $V_2$ the output amplifier 14 produces the output voltage $V_0$ as follows.

$$V_0 = \left(-\frac{R_{48}}{R_{46}}\right)\left[\frac{1}{1 - \frac{R_{70} + R_{72}}{R_{36}} \cdot \frac{R_{40}}{R_{38} + R_{40}}} \times \qquad (20)\right.$$

$$\left. (R_{70} + R_{72})\left[\frac{1}{R_3}\{C_1 + C_2(PU)^n\}\right]^{\frac{1}{2}}\right] +$$

-continued $$\left(1 + \frac{R_{48}}{R_{46}}\right) \frac{R_{52}}{R_{50} + R_{52}} \cdot V_B$$

Figure 9:
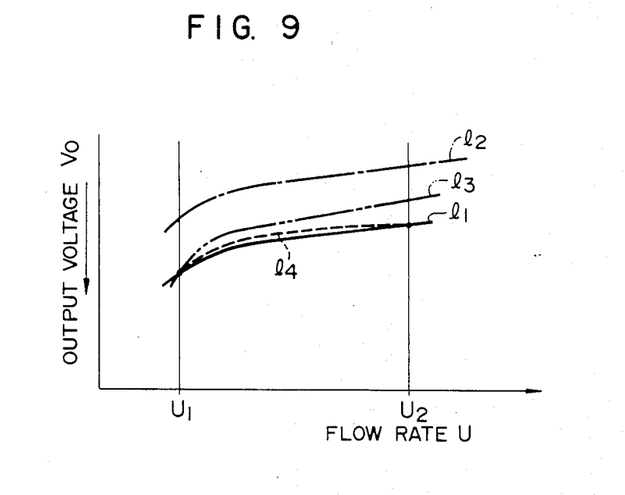
FIG. 9 is a graph showing the output characteristics of the third embodiment.

FIG. 9 shows the output characteristics of the above circuit arrangement. The curve $l_1$ represents the characteristics in the absence of the current circuit 20 as given by equation (18). When the current circuit 20 is connected to supply the current $I_{20}$, the curve $l_1$ is lowered by an amount proportional to the output current $I_{20}$ with the result of the characteristic curve $l_2$.

As in the first embodiment, by adjusting the resistors 50 or 52 in the output circuit 14 so that the output voltage $V_0$ at flow rate $U_1$ coincides with the otput voltage $V_{01}$ on the curve $l_1$, the curve $l_2$ is converted to a curve $l_3$. Subsequently, by adjusting the resistor 48 so that the output voltage $V_0$ at flow rate $U_2$ coincides with the output voltage $V_{02}$ on the curve $l_1$, the curve $l_3$ is converted to a curve $l_4$ on which output voltages are slightly lower than those of the curve $l_3$ in the flow rate range between $U_1$ and $U_2$.

As described above, any of the foregoing embodiments is capable of compensating disparities of the output characteristics among apparatus as shown in FIG. 4 caused by disparities of the property of the thermo-sensitive resistive elements 3 and 6.

Accordingly, by initially classifying disparities of the resistance of the thermo-sensitive resistive elements 3 and 6, adjusting the resistors 36, 38 and 40 depending on the classified characteristic data to set the current $I_{20}$, and finally adjusting the resistors 48, 50 and 52 to unify the output characteristics, flow rate measuring apparatus getting rid of disparities in the output characteristics can be realized.

Moreover, through the application of the foregoing three embodiments selectively depending on the property of the thermo-sensitive elements to have the characteristics curve $L_4$ of FIG. 6 or the characteristic curve $l_4$ of FIG. 9, any number of flow rate measuring apparatus can have the unique output characteristics despite the presence of disparities in the property of thermo-sensitive resistive elements.

What is claimed is:

1. A hot-wire flow rate measuring apparatus comprising:
    a first thermo-sensitive resistive element disposed in the flow path of fluid under measurement;
    first resistor means connected in series with said first thermo-sensitive resistive element to form a first series circuit;
    a second thermo-sensitive resistive element for temperature compensation disposed in the flow path of the fluid;
    second resistor means connected in series with said second thermo-sensitive resistive element to form a second series circuit;
    means for detecting the difference between a voltage corresponding to a voltage across said first thermo-sensitive resistive element and a voltage produced by said second thermo-sensitive resistive element;
    means for controlling a current fed to said first series circuit in accordance with the voltage detected by said detecting means;
    an output circuit for outputting a voltage indicating a flow rate of the fluid in accordance with the voltage across said first resistor means;
    a current circuit including means for supplying a compensation current, which is controlled by a voltage across said first resistor means, to a part of said first series circuit, whereby variations of the output characteristics of said output circuit caused by the variations of the characteristics of said thermo-sensitive resistive elements can be compensated in accordance with said compensation current.

2. A flow rate measuring apparatus according to claim 1, wherein said current circuit is connected to receive a voltage at the node between said first resistor means and said first thermo-sensitive resistance element and supplies a compensation current which is proportional to said voltage at said node point to said first thermo-sensitive resistive element.

3. A flow rate measuring apparatus according to claim 2, further comprising:
    means for dividing a voltage across said first thermo-sensitive resistive element; and
    means for controlling the voltage across said second series circuit so that the voltage across said first resistor means is equal to the voltage across said second resistor means, said detecting means comprising means for detecting the difference between the output voltage of said voltage dividing means and the voltage produced by said second thermo-sensitive resistive element.

4. A flow rate measuring apparatus according to claim 2, wherein said detecting means comprises means having two input terminals connected to a node point between said first resistor means and said first thermo-sensitive resistive element and a node point between said second resistor means and said second thermo-sensitive resistive element, respectively, for detecting the difference between the voltage across said first resistor means and the voltage across said second resistor means.

5. A flow rate measuring apparatus according to claim 1, wherein said first resistor means comprises a first resistor connected in series to said first thermo-sensitive resistive element and a second resistor connected in series to said first resistor, said current circuit being connected to receive a voltage at the node point of said first and second resistors to thereby supply said compensation current in response to the received voltage.

6. A flow rate measuring apparatus according to claim 5, further comprising:
    means for dividing the voltage across said first thermo-sensitive resistive element; and
    means for controlling the voltage across said second series circuit so that the voltage across said first resistor means is equal to the voltage across said second resistor means, said detecting means comprising means for detecting the difference between the output voltage of said voltage dividing means and the voltage produced by said second thermo-sensitive resistive element.

7. A hot-wire flow rate measuring apparatus comprising:
    a first thermo-sensitive resistive element disposed in the flow path of fluid under measurement;
    first resistor means connected in series with said first thermo-sensitive resistive element to form a first series circuit;
    a second thermo-sensitive resistive element for temperature compensation disposed in the flow path of the fluid;

second resistor means connected in series with said second thermo-sensitive resistive element to form a second series circuit;

means for dividing a voltage across said first thermo-sensitive resistive element;

means for controlling the voltage across said second series circuit so that the voltage across said first resistor means and the voltage across said second resistor means are equal to each other;

means for detecting the difference between the output voltage of said voltage dividing means and a voltage produced by said second thermo-sensitive resistive element;

means for controlling a current fed to said first series circuit in accordance with the output of said detecting means;

an output circuit including means for outputting a voltage indicating a flow rate of the fluid in accordance with the voltage across said first resistor means; and a current circuit including means responsive to a voltage across said first resistor means for supplying a compensation current to a part of said first series circuit, whereby variations of the output characteristics of said output circuit caused by the variations of the characteristics of said thermo-sensitive resistive elements can be compensated by not only adjusting said compensation current by adjusting the circuit constants of said current circuit, but also by adjusting the circuit constants of said output circuit.

8. A hot-wire rate measuring apparatus according to claim 7, wherein said current circuit is connected to receive a voltage at the node point between said first resistor means and said first thermo-sensitive resistive element and supplies a compensation current which is proportional to said voltage at the node point to said first thermo-sensitive resistive element.

9. A hot-wire rate measuring apparatus according to claim 8, wherein said current circuit includes a first operational amplifier and input resistor means connected to said first operational amplifier, said output circuit includes a second operational amplifier and input and feedback resistor means connected to said second operational amplifier, whereby variations of the output characteristics of said output circuit caused by the variations of the characteristics of said thermo-sensitive resistive elements can be compensated by not only adjusting said compensation current by adjusting said input resistor means of said current circuit, but also by adjusting said input and feedback resistor means of said output circuit.

10. A hot-wire flow rate measuring apparatus according to claim 7, wherein said first resistor means includes a first resistor connected in series with said first thermo-sensitive resistive element and a second resistor connected in series with said first resistor, and said current circuit is connected to receive a voltage at the node point between said first and second resistors and supplies a compensation current which is proportional to said voltage at the node point to said first resistor.

11. A hot-wire rate measuring apparatus according to claim 10, wherein said current circuit includes a first operational amplifier and input resistor means connected to said first operational amplifier, said output circuit includes a second operational amplifier and input and feedback resistor means connected to said second operational amplifier, whereby variations of the output characteristics of said output circuit caused by the variations of the characteristics of said thermo-sensitive resistive elements can be compensated by not only adjusting said compensation current by adjusting said input resistor means of said current circuit, but also by adjusting said input and feedback resistor means of said output circuit.

12. A hot-wire flow rate measuring apparatus comprising:

first thermo-sensitive resistive element disposed in the flow path of fluid under measurement;

first resistor means connected in series with said first thermo-sensitive resistive element to form a first series circuit;

a second thermo-sensitive resistive element for temperature compensation disposed in the flow path of the fluid;

second resistor means connected in series with said second thermo-sensitive resistive element to form a second series circuit which is connected in parallel with said first series circuit;

means for detecting the difference between a voltage at a first node point of said first thermo-sensitive resistive element and said first resistor means and a voltage at a second node point of said second thermo-sensitive resistive element and said second resistor means;

means for controlling a current fed to said first and second series circuits in accordance with the output of said detecting means;

an output circuit including means for outputting a voltage indicating a flow rate of the fluid in accordance with a voltage across said first resistor means; and a current circuit including means responsive to a voltage across said first resistor means for supplying a compensation current to a part of said first series circuit, whereby the variations of the output characteristics of said output circuit caused by the variations of the characteristics of said first and second thermo-sensitive resistive elements can be compensated by not only adjusting said compensation current by adjusting the circuit constants of said current circuit, but also by adjusting the circuit constants of said output circuit.

13. A hot-wire flow rate measuring apparatus according to claim 12, wherein said current circuit is connected to receive a voltage at said first node point and supplies a compensation current which is proportional to said voltage at said first node point to said first thermo-sensitive resistive element.

14. A hot-wire rate measuring apparatus according to claim 13, wherein said current circuit includes a first operational amplifier and input resistor means connected to said first operational amplifier, said output circuit includes a second operational amplifier and input and feedback resistor means connected to said second operational amplifier, whereby variations of the output characteristics of said output circuit caused by the variations of the characteristics of said thermo-sensitive resistive elements can be compensated by not only adjusting said compensation current by adjusting said input resistor means of said current circuit, but also by adjusting said input and feedback resistor means of said output circuit.

15. A hot-wire flow rate measuring apparatus according to claim 12, wherein said first resistor means includes a first resistor connected in series with said first thermo-sensitive resistive element and a second resistor connected in series with said first resistor, and said current circuit is connected to receive a voltage at a third node point between said first and second resistors and supplies a compensation current which is proportional to said voltage at said third node point to said first resistor.

16. A hot-wire rate measuring apparatus according to claim 15, wherein said current circuit includes first a operational amplifier and input resistor means connected to said first operatinal amplifier, said output circuit includes a second operational amplifier and input and feedback resistor means connected to said second operational amplifier, whereby variations of the output characteristics of said output circuit caused by the variations of the characteristics of said thermo-sensitive resistive elements can be compensated by not only adjusting said compensation current by adjusting said input resistor means of said current circuit, but also by adjusting said input and feedback resistor means of said output circuit.

* * * * *